March 19, 1929.  A. W. HEYMAN  1,706,292
CONVEYING AND MEASURING APPARATUS
Original Filed Oct. 8, 1926
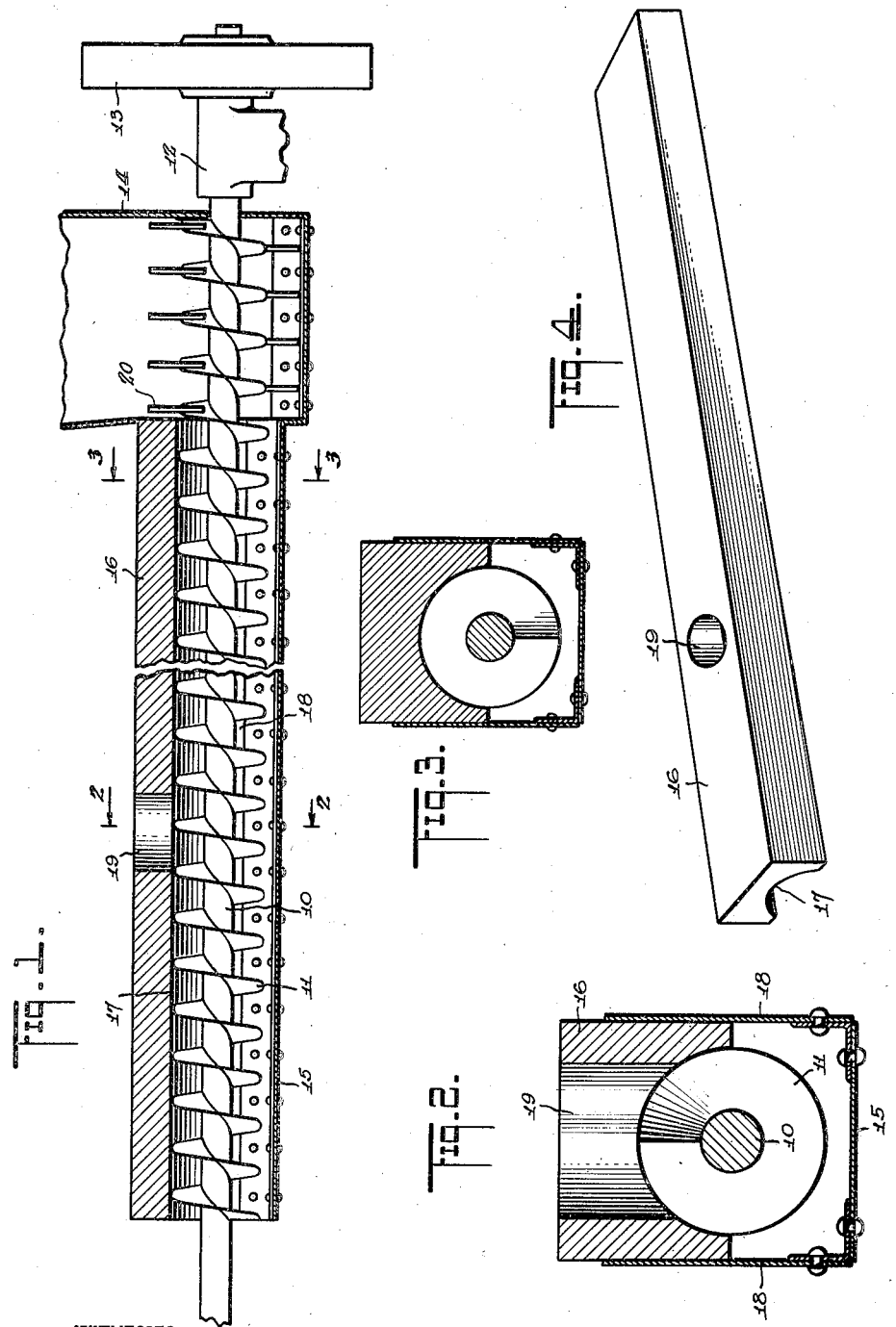
WITNESSES
INVENTOR
Arthur W. Heyman,
BY
ATTORNEYS Patented Mar. 19, 1929.

1,706,292

UNITED STATES PATENT OFFICE.

ARTHUR W. HEYMAN, OF NORTHAMPTON, PENNSYLVANIA.

CONVEYING AND MEASURING APPARATUS.

Application filed October 8, 1926, Serial No. 140,324. Renewed August 14, 1928.

The present invention is concerned with the provision of feeding and measuring apparatus of the screw conveyor type, primarily designed to effect a uniform feed of granular or pulverulent material without any danger of the material flooding or accelerating its rate of feed.

The ordinary type of so-called screw conveyor works in a pipe or box which constitutes a housing, one end of the conveyor being usually located in the bottom of a storage chamber for the material to be fed, and the other end of the conveyor discharging the material at any desired point.

The feeding of a screw conveyor is substantially uniform as long as there is no appreciable space between the conveyor blades and the conveyor housing. As the helical feed screw gradually wears down, this space increases, and results in the undesirable flooding or irregular feeding which I desire to overcome. As a matter of fact, there is very little danger of flooding between the conveyor blades and the bottom of the casing when feeding granular or pulverulent material because of the fact that this material packs rather firmly in the bottom of the housing and is self-resistant to a surging movement under a sudden impetus at the hopper. Material dumped into the hopper however, or material suddenly caving at the hopper frequently causes a surging or flooding through the space between the top of the blades and the top of the housing, with consequent irregularity in the feed of the device.

In a preferred embodiment of the present invention, I overcome the above noted disadvantage by the simple expedient of providing an adjustable top, such as a floating top for the housing which is at all times disposed closely adjacent the helical blade, and, inasmuch as no appreciable space is left between the upper portion of the blade and its casing, flooding is eliminated, and the feed is rendered uniform.

Preferably the floating top rests directly on the blade and is of some material which will not tend to unduly wear down the edges of the blade.

Other objects of the invention are to provide a feeding and measuring device of the character above noted, which will be of simple, practical construction, rugged and durable in use, efficient in operation and economical to manufacture and install.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view mainly in longitudinal section showing a measuring and feeding device of the screw conveyor type, and an associated hopper.

Fig. 2 is an enlarged transverse sectional view on the line 2—2 of Fig. 1.

Fig. 3 is a similar enlarged transverse sectional view on the line 3—3 of Fig. 1.

Fig. 4 is a perspective view of the floating choker block.

In the drawings showing one preferred embodiment of the invention, I have designated the shaft of the screw conveyor by the numeral 10, and the helical blade or screw as 11. This blade is preferably of a fairly steep pitch so that the liability of the material flooding in a helical path around the spirals of the blade is rendered negligible. The shaft 10 may be mounted in any suitable bearings such for instance as 12 and carry a pulley wheel 13 operated through any suitable power. One end of the conveyor is passed through the bottom of a hopper 14, and the remaining portion of the conveyor is disposed within a casing or housing 15. This casing has been shown as of box-like formation, but the lower part might obviously be of circular cross section. The top of the casing 15 is defined by an elongated floating choker block 16 having an arcuate longitudinal groove 17 in its lower face which rests directly upon the screw 11. This block may extend the full length of the casing, although it may be shortened to cover only two or three blades of the conveyor without substantially reducing its effectiveness. Block 16 slides within the side walls 18 of the casing and moves downwardly by its own weight as the blade edges become worn. It will be noted that approximately the upper half of the screw is snugly encircled by the block, and that the space above the screw through which flooding of material ordinarily occurs is completely closed by the block.

In order to prevent undue wearing away of the blade edges, I preferably form the block, of wood, or of some material much softer than the blade, so that the block rather than the blade will be worn by frictional contact. The choker block may be formed with an opening 19 in its top to permit the observation of the material being carried along by the screw conveyor. The end of the conveyor which is mounted in the bottom of the hopper 14 preferably carries agitating arms 20 which tend to maintain the end of the conveyor covered with material being fed, and to prevent the formation of pockets in the bottom of the mass of material which might cause sudden caving and surging of material through the box 15.

It will be apparent that by virtue of the foregoing construction, I have rendered the screw conveyor a means for accurately measuring and feeding granular or pulverulent material, and that any desired amount of material may be fed in a given time by simply regulating the speed of the screw shaft.

Obviously a manually adjustable instead of a self-adjusting top might be used, and various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A feeding and measuring apparatus for handling granular or pulverulent material including a screw conveyor and a housing therefor, said housing including a vertically adjustable floating top conforming on its under face to the general cross sectional shape of the screw.

2. A feeding and measuring apparatus for handling granular or pulverulent material including a screw conveyor and a housing therefor, said housing including an adjustable top resting directly upon the screw and having an arcuate groove in its under face, whereby it may partially embrace the screw.

3. A feeding and measuring apparatus for handling granular or pulverulent material including a screw conveyor and a housing therefor, said housing including a floating top, said floating top comprising an elongated block of relatively soft material resting on the screw to prevent flooding of the material being fed between the screw and the top of the housing.

4. A device of the class set forth in claim 2, and wherein the floating block is formed with a sight opening therein.

5. A housing for a screw type conveyor including stationary bottom and side walls, and a floating choker block adapted to serve as the top wall of the housing and to rest on a screw in the housing.

6. A feeding and measuring apparatus for handling granular or pulverulent material including a screw conveyor and a housing therefor, the housing including an adjustable top having an arcuate groove in its under face struck from the same center as the screw, whereby it may partially embrace the screw and prevent flooding of material between the screw and the top of the housing.

ARTHUR W. HEYMAN.